United States Patent

Reid

[15] 3,646,730

[45] Mar. 7, 1972

[54] NATURAL GAS FILTER

[72] Inventor: Laurance S. Reid, 601 Broad Lane, Norman, Okla. 73069

[22] Filed: Apr. 1, 1969

[21] Appl. No.: 811,779

[52] U.S. Cl. ................................. 55/302, 55/350, 55/419, 55/504, 55/505
[51] Int. Cl. .................................................... B01d 46/04
[58] Field of Search ........................ 55/172, 174, 301–303, 55/504, 505, 312, 324, 419, 483, 484, 510, 350; 210/DIG. 5, 323, 324, 333, 334, 316, 340, 341

[56] References Cited

UNITED STATES PATENTS

| | | | |
|---|---|---|---|
| 312,527 | 2/1885 | Spitznagel | 210/341 |
| 1,429,713 | 9/1922 | Cazier et al. | 55/303 |
| 2,868,322 | 1/1959 | Stauffer | 55/419 |
| 3,027,009 | 3/1962 | Price | 210/DIG. 5 |
| 3,093,469 | 6/1963 | Woolston et al. | 55/DIG. 25 |
| 3,228,174 | 1/1966 | Perry, Jr. | 55/174 |
| 3,473,300 | 10/1969 | Wilm et al. | 55/341 |

FOREIGN PATENTS OR APPLICATIONS

| | | | |
|---|---|---|---|
| 893,649 | 2/1944 | France | 55/350 |
| 724,927 | 2/1955 | Great Britain | 55/302 |
| 12,619 | 0/1900 | Great Britain | 55/350 |

*Primary Examiner*—Frank W. Lutter
*Assistant Examiner*—Bernard Nozick
*Attorney*—Richards, Harris & Hubbard

[57] ABSTRACT

A filter for natural gas having an elongated cylindrical shell capped by a pair of quick-opening end closures. Gas enters through inlets adjacent the opposite ends of the shell and passes inwardly through a pair of filter assemblies to a centrally located main outlet. A blowdown outlet is provided at each end of the shell. Flow through each of the two inlets and each of the three outlets is selectively controlled by separate valves so that gas can be selectively passed in the reverse direction through either of the filter assemblies during low flow rate periods to backflush and clean the filter assembly without taking the system out of operation. Each of the filter assemblies comprises a plurality of cylindrical filter elements extending longitudinally from the upstream face of a pressure bulkhead within the vessel to permit easy replacement of the filter elements through the quick-opening end closures. In normal operation, gas flows from the exterior to the interior of the filter elements to provide maximum filter surface area and a higher blowout pressure.

6 Claims, 6 Drawing Figures

PATENTED MAR 7 1972
3,646,730
SHEET 1 OF 2
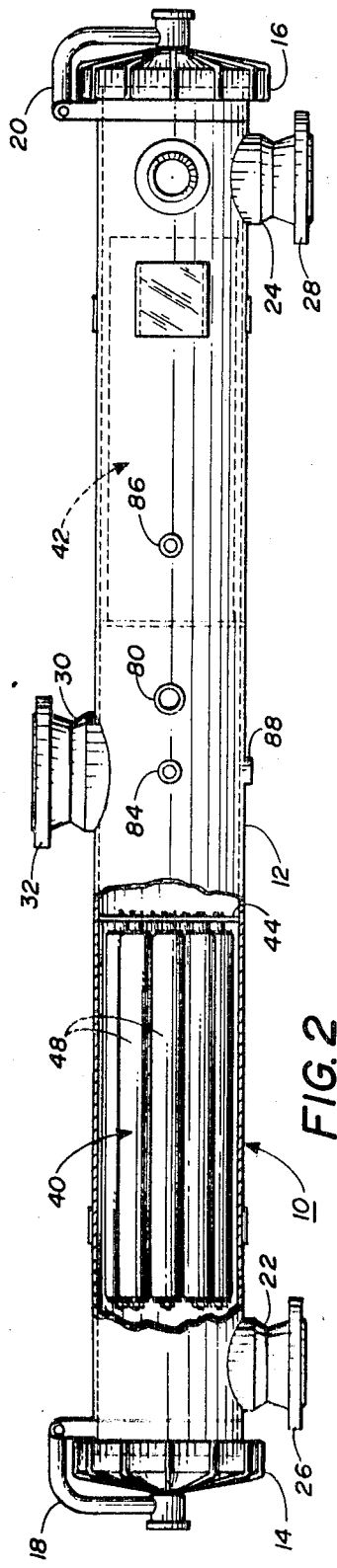
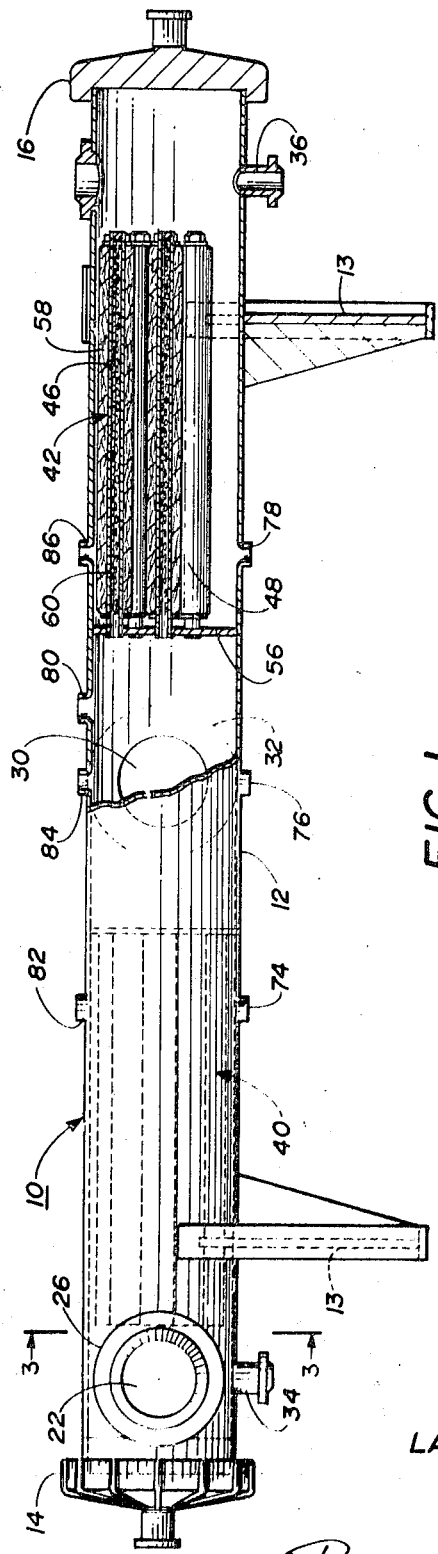
FIG. 1
FIG. 2
INVENTOR:
LAURANCE S. REID
Richards, Harris & Hubbard
ATTORNEY

NATURAL GAS FILTER

BACKGROUND OF THE INVENTION

This invention relates generally to fluid filters, and more particularly relates to a filter suitable for very high-volume flow rates of natural gas.

There are many uses of natural gas which require that substantially all solid particles be removed from the gas. For example, solid particles in gas may plug nozzles of burners, erode pressure and flow control devices, abrade compressor cylinders and rings, and decrease the flow efficiency of pipelines. This invention is concerned with an improved gas filter which has a low pressure drop and which can be backflushed and cleaned without disrupting service. In addition, the filter is relatively inexpensive to fabricate and the inexpensive, commercially available filter elements used in the device can be quickly and easily replaced.

SUMMARY OF INVENTION CLAIMED

The claims are directed to various features of a gas filter system comprising an elongated shell, a gas inlet located adjacent each end of the shell, a main gas outlet located centrally of the shell, a blowdown outlet located adjacent each end of the shell, a filter assembly disposed between the main gas outlet and the respective gas inlets and blowdown outlets, and valve means for selectively controlling the fluid flow through each of the inlets and outlets.

BRIEF DESCRIPTION OF THE DRAWINGS

The novel features believed characteristic of this invention are set forth in the appended claims. The invention itself, however, as well as other objects and advantages thereof, may best be understood by reference to the following detailed description of an illustrative embodiment, when read in conjunction with the accompanying drawings, wherein:

FIG. 1 is a side elevation, partially in section, of a gas filter in accordance with the present invention;

FIG. 2 is a plan view of the gas filter of FIG. 1 that is partially broken away to show details of construction;

DESCRIPTION OF A PREFERRED EMBODIMENT

Figure 3:
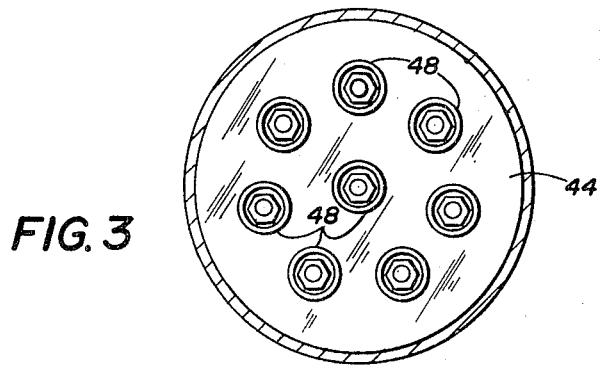
FIG. 3 is a sectional view taken substantially on lines 3—3 of FIG. 1.

Referring now to the drawings, and in particular to FIGS. 1 and 2, a filter apparatus in accordance with the present invention is indicated generally by the reference numeral 10. The filter apparatus 10 is comprised of an elongated cylindrical shell 12 which is supported in the horizontal position by a pair of legs 13. The ends of the shell 12 are closed by a pair of quick-disconnect caps 14 and 16. The caps 14 and 16 are normally threaded onto the ends of the cylindrical shell 12 and are pivotally supported on arms 18 and 20, respectively, so that they may be swung out of the way after being unthreaded from the shell 12.

Inlets 22 and 24 are provided at opposite ends of the shell 12 by welded fittings which terminate in conventional flanges 26 and 28. An outlet 30 having a cross-sectional area approximately equal to the combined area of inlets 22 and 24 is provided at the center of the shell 12 by a welded fitting which terminates in a conventional flange 32. Smaller diameter blowdown outlets 34 and 36 are provided in the bottom of the shell 12 at points adjacent the inlets 22 and 24. Fluid flow through each of the inlets 22 and 24, and outlets 30, 34 and 36 is selectively controlled by a valve (not illustrated in FIGS. 1 and 2) as will hereafter be described.

Figure 4:
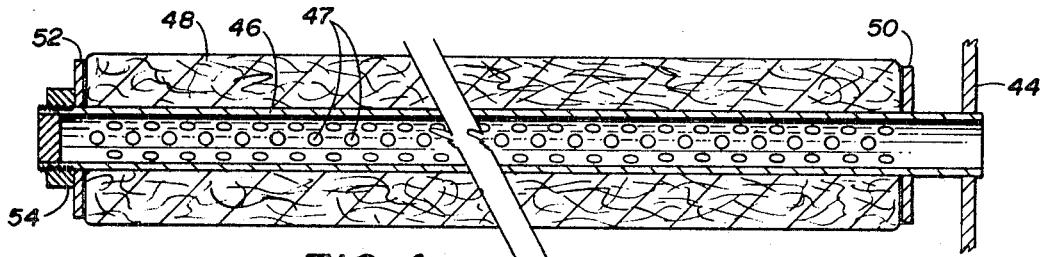
FIG. 4 is a longitudinal sectional view of the mounting for a single filter element of the filter system of FIG. 1.

A first filter assembly 40 is disposed within the shell 12 between the inlet 22 and the outlet 30, and a second, identical filter assembly 42 is disposed between inlet 24 and outlet 30. The filter assembly 40 is comprised of a pressure bulkhead 44 welded within the shell 12. Eight tubes 46 having perforations 47 are welded in and extend upstream from the pressure bulkhead 44 in the symmetrical configuration shown in the sectional views of FIGS. 3 and 4. A filter element 48 is disposed around each of the perforated tubes 46, and is held between an end plate 50, which is welded to the tube 46, and an end plate 52, which is held in place by a nut 54 threaded onto the end of the tube 46. Similarly, the filter assembly 42 has a pressure bulkhead 56 and eight filter elements 58 mounted on perforated tubes 60 which extend upstream from the bulkhead 56.

Figure 5:
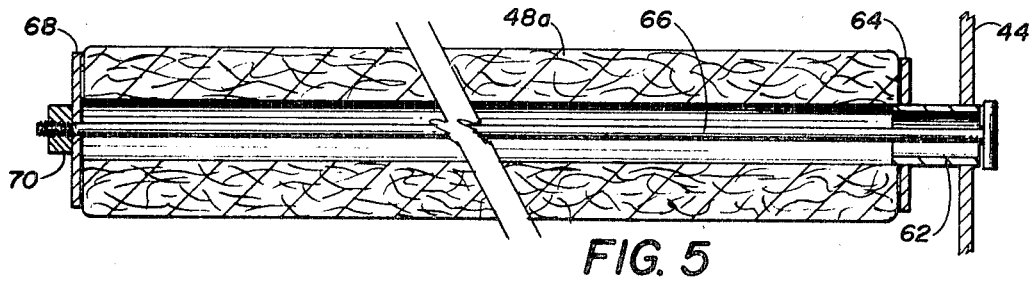
FIG. 5 is a longitudinal sectional view of an alternative mounting for a single filter element of the filter system of FIG. 1.

Alternatively, each of the filter elements 48 or 58 can be mounted as shown in FIG. 5. In this type of installation, a short nipple 62 is welded in the bulkhead 44. An end plate 64 is welded to the end of the nipple 62. A modified filter element 48a is secured in place by a T-bar 66 extending through the nipple 62 and through a second end plate 68 which is held in place by a nut 70 threaded onto the end of the T-bar. In this installation, the filter element 48a contains its own internal shell for preventing collapse of the filter element under the external pressures. Although the tubular type filter elements are a preferred form of the invention, other types of replaceable filter elements are also contemplated as being within the broader aspects of the invention.

As is shown in FIGS. 1 and 2, various fittings are also provided in the shell 12 for monitoring and servicing functions. Fittings 74, 76 and 78 are provided in the bottom of the shell 12 to provide liquid drains. These fittings are closed by appropriate valves (not illustrated). Fitting 80 provides a gas vent in the top of the shell 12 and is also closed by an appropriate valve (not illustrated). Fittings 82, 84 and 86 receive pressure gauges, and fitting 88 receives a thermometer.

Figure 6:
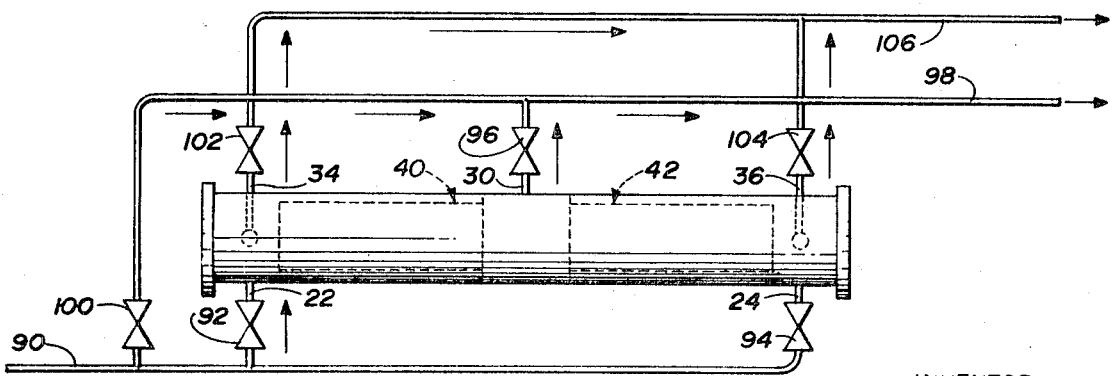
FIG. 6 is a schematic piping diagram of a filter system in accordance with the present invention.

In operation, the filter device 10 is connected into a system as illustrated in FIG. 6. Gas under pressure is supplied to the filter 10 through an inlet conduit 90 which is connected through valves 92 and 94 to the inlets 22 and 24. Gas leaves the filter device 10 through the main gas outlet 30 which is connected through a valve 96 to an outlet conduit 98. Alternatively, gas can be bypassed around the filter device 10 through a valve 100 which connects the conduit 90 to the conduit 98. In normal operation, gas is passed through either or both of the filter assemblies 40 and 42 merely by closing valve 100, opening valves 92 and/or 94 and opening valve 96. As mentioned, outlet 30 and valve 96 are designed to handle approximately twice the volume of inlets 22 and 24 and valves 92 and 94, at the normal operating pressures. In a typical installation, the shell may be 24 inches in diameter and 18 feet in length, the inlets 22 and 24 may be 12 inches in diameter, outlet 30 may be 16 inches in diameter, and blowdown outlets 34 and 36 may be 3 inches in diameter. Therefore, gas is normally passed to the outlet 30 through both of the filter assemblies 40 and 42.

The blowdown outlets 34 and 36 are connected by small valves 102 and 104 to a conduit 106 leading to a waste disposal flare or the like. The chambers upstream of the filter assemblies 40 and 42 can be cleaned during normal operation simply by opening either of the relatively small valves 102 or 104 to discharge liquids or loose solids that may have collected in the shell but are not lodged on the surfaces of the filter elements. Also, the filters can be backflushed and cleaned without interrupting operation during any period when the total flow is about half of the rated capacity, or less. This is achieved by closing either of the inlet valves 92 or 94, and opening the relatively small blowdown valves 102 or 104, respectively, at the other end of the shell 12 so that gas will flow in the forward direction through one filter assembly, then in the reverse direction through the other filter. For example, when valve 94 is closed and valve 104 opened, gas will flow through valve 92 and through filter assembly 40 in the forward direction, then through filter assembly 42 in the reverse direction, and out through valve 104. Alternatively, valve 92 may be closed and valve 102 opened to backflush filter assembly 40. In either instance, gas continues to flow out through the main outlet 30 and valve 96 so that service is not disrupted.

In the event it is necessary to backflush the filter elements during periods when flow is at the full rated capacity, the bypass valve 100 may be partially opened to divert approximately half the flow around the filter system and the same backflushing procedure repeated. Although a portion of the gas stream is not filtered during this period, no harm is done during the relatively short length of time required for this procedure.

The ability to backflush and clean the filter elements of assemblies 40 and 42 substantially prolongs the operational life of the elements. In addition, since normal flow is from outside to inside the elements, a greater filter area is provided and the rupture pressure of the elements is substantially increased when compared with the flow from inside to outside. The elements can be relatively quickly and easily replaced merely by removing the appropriate cap 14 or 16, and the nuts 54.

Although a preferred embodiment of the invention has been described in detail, it is to be understood that various changes, substitutions and alterations can be made therein without departing from the spirit and scope of the invention as defined by the appended claims.

I claim:

1. The gas filter system comprising:
   an elongated, cylindrical, horizontally disposed shell,
   quick-disconnect closure means closing the ends of the shell,
   a pair of spaced gas inlets in the cylindrical shell, one disposed adjacent each end of the shell,
   a main gas outlet in the cylindrical shell located between the inlets, and
   a pair of filter assemblies, one disposed between the main gas outlet and each of the inlets, each filter assembly including a pressure bulkhead having apertures and replaceable tubular filter elements mounted on the bulkhead at said apertures in flow communication therewith, the replaceable filter elements being located upstream of the bulkhead and adjacent the respective closure means.

2. The gas filter system of claim 1 wherein:
   the filter elements are tubular and the gas flows from the outside to the inside of each of the elements and then through the bulkhead.

3. The gas filter system of claim 1 wherein each filter assembly comprises:
   a plurality of perforated tubes extending upstream from the bulkhead, the interior of each tube being in fluid communication with the downstream side of the bulkhead, and
   a tubular filter element disposed around each perforated tube such that gas can pass into the interior of the tube only after having passed through the filter element.

4. The gas filter system comprising:
   first and second gas filter means having separate gas inlets and a common main gas outlet having approximately twice the flow capacity as each of the inlets,
   the first and second gas filter means being formed as a common elongated shell with the gas inlets adjacent the ends of the shell and the common gas outlet near the center of the shell, each gas filter means including
   a pressure bulkhead disposed in the shell between the respective gas inlet and the main gas outlet,
   a plurality of tubular replaceable filter elements extending upstream from the bulkhead, the interior of each filter element being in fluid communication with the downstream side of the pressure bulkhead such that gas flows through the filter element from the outside to the inside,
   manifold means including first and second valve means for selectively controlling the flow of gas from a source through the inlets of the first and second filter means, respectively,
   first and second blowdown outlets for the first and second gas filter means, respectively, for venting gas and particulate matter when the respective first and second valve means is closed and gas is passed in the forward direction through the other gas filter means and then in the reverse direction through the respective gas filter means, each of the blowdown outlets having a flow capacity substantially less than the flow capacity of each of the gas inlets, and
   third and fourth valve means for selectively controlling the flow of gas through the first and second blowdown outlets, respectively.

5. The gas filter system defined in claim 4 further characterized by:
   a removable end closure over each end of the shell to permit replacement of the filter elements when removed.

6. A gas filter system comprising:
   an elongated generally tubular shell having closed ends,
   first and second gas inlets in the shell, one at each end of the shell,
   means for directing a gas stream to the first and second gas inlets,
   a main gas outlet in the shell located between the inlets,
   first and second filter assemblies disposed within the shell between the main gas outlet and the first and second gas inlets, respectively, each filter assembly including a pressure bulkhead means having apertures and supporting a plurality of tubular porous filter elements in flow communication with the apertures for separating particulate material from the gas as the gas passes from the respective gas inlet to the main gas outlet,
   first and second blowdown gas outlets adjacent each inlet for removing gas and particulate material flushed from the respective filter assembly by gas passed in through the gas inlet at the other end of the shell, through the other filter assembly in the forward direction, and then through the respective filter assembly in the reverse direction,
   first and second valve means for selectively controlling the flow of gas through the first and second gas inlets, respectively, and
   third and fourth valve means for selectively controlling the flow of gas through the first and second blowdown gas outlets.

* * * * *